V. BENDIX.
ENGINE STARTER.
APPLICATION FILED DEC. 17, 1917.
1,348,147.
Patented Aug. 3, 1920.
2 SHEETS—SHEET 1.
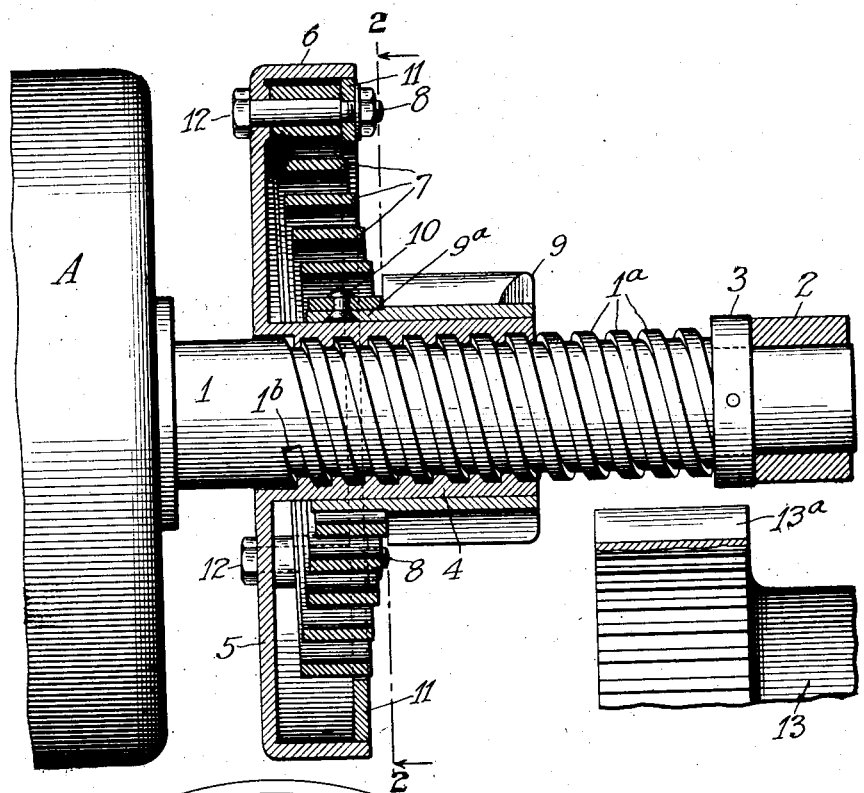
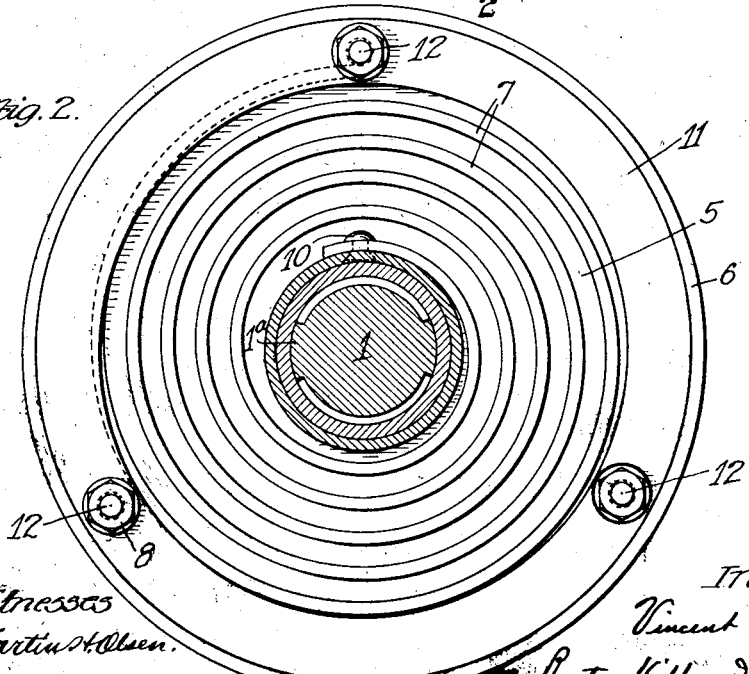

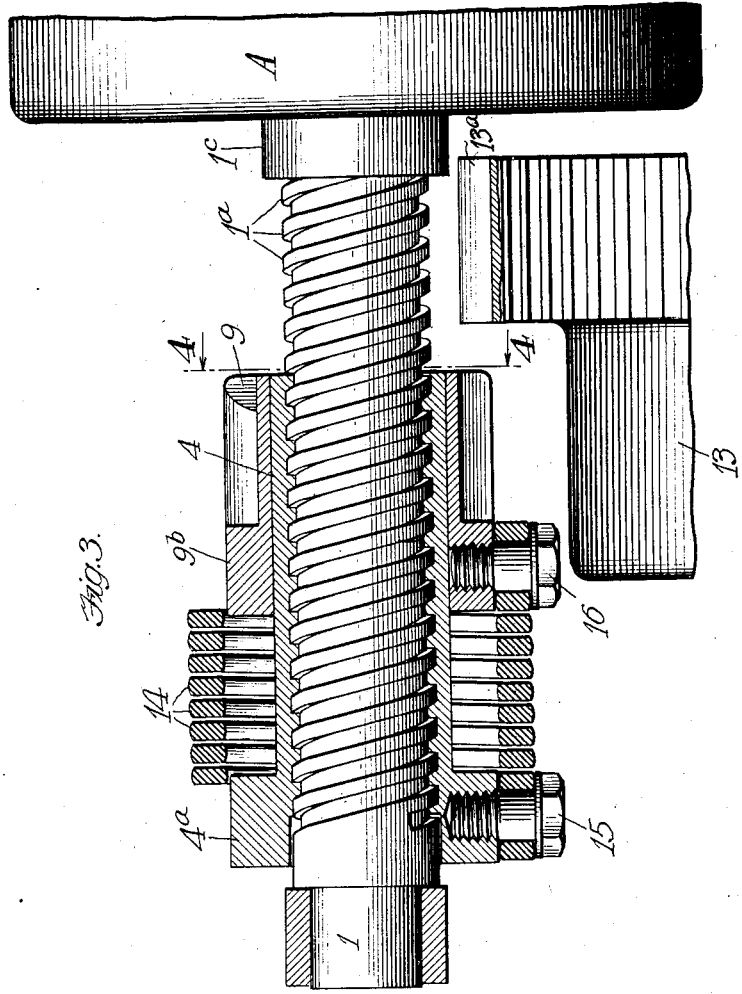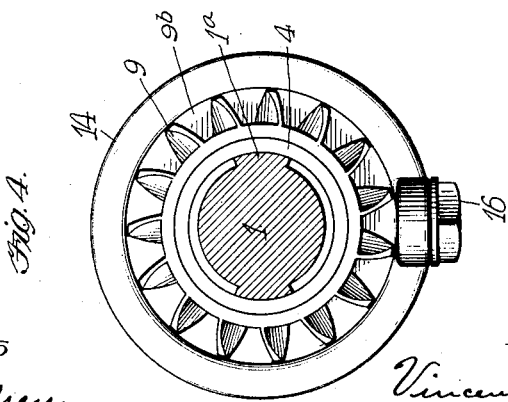

UNITED STATES PATENT OFFICE.

VINCENT BENDIX, OF CHICAGO, ILLINOIS.

ENGINE-STARTER.

1,348,147.  Specification of Letters Patent.  Patented Aug. 3, 1920.

Application filed December 17, 1917. Serial No. 207,459.

*To all whom it may concern:*

Be it known that I, VINCENT BENDIX, a citizen of the United States, residing at Chicago, in the county of Cook and State of Illinois, have invented certain new and useful Improvements in Engine-Starters, of which the following is a specification.

My invention relates to the drive or transmission of starting apparatus for engines, more particularly internal combustion engines, and the general object thereof is to provide a novel and efficient drive of this character. The features of novelty and advantage in my new form of drive will be apparent from the description hereinafter given.

My drive or transmission belongs to that type which is characterized by a rotatable member such as a screw shaft which may be operated either directly or indirectly by a prime mover such as an electric motor, and adapted to control and operate a driving member so as to automatically advance the latter into operative engagement with a part of the engine to be started such as the fly wheel, and to thereafter rotate the same and consequently said fly wheel, said driving member being automatically detached from its operative engagement when the engine starts on its own power. My present invention concerns more particularly a screw member which is mounted on the screw shaft and made in two parts, one a control member and the other the driving member proper, said parts being so constructed and associated as to produce novel and advantageous results.

In the drawings Figure 1 is a sectional elevation of my new form of drive; Fig. 2 a sectional elevation on the line 2—2 of Fig. 1; Fig. 3 a sectional elevation of a modified form of construction; and Fig. 4 a section on the line 4—4 of Fig. 3.

In so far as my invention is concerned, the rotatable member or screw shaft may be operated directly or indirectly by the electric motor, and while in the present instance I have shown it as operated directly by such motor, being in fact the extended portion of the armature shaft thereof, it will be understood that my structure and this invention are not to be limited to such direct driving.

As herein shown the motor A drives the screw shaft 1, which is here the extended armature shaft thereof, and which may have a suitable bearing 2 at its outer end. This screw shaft has screw-threads $1^a$, the inner ends whereof terminate in an abrupt shoulder $1^b$ but stop the screw member as hereinafter explained. At the outer ends of the threads is located a stop nut or collar 3 secured to the shaft in any suitable manner.

Upon the screw shaft is mounted the screw member which is here formed of two main parts, one the control member and the other the driving member. The control member consists of a sleeve 4 internally screw-threaded and adapted to screw upon the shaft 1 and thereby be capable of a longitudinal movement thereof as well as a rotary movement therewith when it comes into contact with the stop nut 3 as hereinafter explained. This control member is provided with a suitable radial support for a yielding driving connection between it and the driving member. In the present instance this support is formed as a circular disk 5 integral with the sleeve and having an outwardly directed right-angled marginal flange 6. This structure forms a casing or drum as well as a support for the flat spiral spring 7 whose inner end is anchored by means of the bolt 8 to the disk toward the periphery thereof, the inner end thereof being secured to the extended hub portion $9^a$ of the driving member 9 in suitable manner as by means of the rivet 10. To rigidly hold the anchoring bolt 8 in place I provide a ring 11 through which the outer end of such bolt passes and which is also secured to the disk at other points by means of the additional bolts 12.

As shown in Fig. 1 the coils of the spiral spring do not lie in substantially the same plane, but are drawn outwardly at the center so that in section, as therein shown, the spring appears in general as a truncated cone. The object of this construction is to permit of a proper yielding inward movement of the driving member upon the screw sleeve for the purpose hereinafter explained.

The driving member which is the member adapted to engage the part of the engine to be started is here in the form of a pinion, and the same is adapted to mesh with the teeth $13^a$ of the fly wheel 13 of the engine. This pinion has a central smooth bore and is adapted to float upon the outer surface of the screw sleeve 4, such pinion having a yielding longitudinal movement thereon and also a yielding rotary movement thereon. The pinion is also adapted to rotate with the screw sleeve, being driven from such sleeve through the driving spring.

Describing the operation and beginning the description of the cycle of operation with the parts in their normal position shown in Fig. 1, the starting of the electric motor causes the rotation of the screw shaft whereupon the entire screw member consisting of the screw sleeve and pinion and associate parts will be automatically advanced longitudinally of the screw shaft until the outer end of the screw sleeve comes into contact with and is stopped by the nut or collar 3. In this longitudinal advance movement, the driving member or pinion is brought into mesh with the fly wheel teeth and consequently when such movement is stopped by the nut 3, the entire screw member will be rotated in unison with the screw shaft and the fly wheel will be rotated to start the engine. When the engine runs on its own power this screw member will be automatically demeshed and restored to the normal or home position shown, such inward movement being stopped by the contact of the inner end of the threads of the screw sleeve against the abrupt shoulders $1^b$ of the screw shaft. In this construction the screw member may or may not be provided with weight means, the inertia of the parts which is increased by the diameter of the disk 5 being sufficient to assure said longitudinal movement of the screw member.

In the event that the teeth of the fly wheel should not be so presented as to permit immediate and proper meshing therewith of the pinion teeth and a consequent abutting of such teeth end to end, the pinion will be momentarily stopped but the screw sleeve will be advanced by the screw action. The screw sleeve will therefore slide within the pinion and such relative movement will be yieldingly permitted by the driving spring 7 which by preference is given the conical formation hereinbefore explained. This stoppage of the pinion will cause the latter to be slightly rotated and the result will be to bring the teeth into proper register for meshing, whereupon the advance movement will continue and the fly wheel will be rotated in the manner hereinbefore explained. One of the advantages of making the pinion thus separate and very light in weight is to avoid shock of any heavy moving part or pinion against the fly wheel, it being understood that the only shock resulting from the abutment of the teeth end to end is that of this light pinion, which shock is moreover cushioned and relieved by the spring 7, in the manner above explained.

In Figs. 3 and 4 I have shown a structure of modified form but operating on the same general principle as the structure already described. In this construction the similar parts are given corresponding reference characters. According to this construction the screw member which is in the form of a sleeve as before is operatively connected with the driving member by means of a different form of driving spring. As shown the screw sleeve 4 has at its outer end an enlargement or driving head $4^a$, and the pinion 9 is also provided at its outer end with a driving head or portion $9^b$. The yielding driving connection here consists of a coiled spring 14 encircling the screw sleeve and having its ends secured to the driving heads $4^a$ and $9^b$ respectively by means of the anchoring bolts 15, 16. This spring is capable of being slightly compressed so as to permit of the desired relative movement of the pinion on the screw sleeve when the pinion teeth abut the fly wheel teeth end to end as hereinbefore explained.

Describing the operation of this modified form of construction and beginning the description of the cycle of operation with the parts in their normal position shown in Fig. 3, the starting of the electric motor rotates the screw shaft 1 whereupon the screw member will be advanced longitudinally to the right. When the screw sleeve comes into contact with the stop nut or collar $1^c$ at the inner end of the shaft and is stopped thereby, the pinion and consequently the fly wheel will be rotated, such pinions being driven from the shaft through the screw sleeve and the driving spring. When the engine starts on its own power the screw member will be automatically demeshed and returned to normal position. In the event that the pinion teeth should abut the fly wheel teeth the pinion will be stopped momentarily while the screw sleeve will continue to move forwardly, such relative movement being yieldingly permitted by compression action of the driving spring 14. This stoppage of the pinion will cause a slight rotation thereof which will bring the teeth into proper register for meshing, whereupon the advance longitudinal movement will continue until stopped.

I claim:

1. An engine starter drive or transmission comprising a rotatable member, and an operating member mounted thereon for longitudinal movement thereof and rotary movement therewith, said operating member being formed of two parts, one a control member mounted on said rotatable member and having an outer bearing surface of uniform diameter, and the other a driving member having a smooth bore fitting onto said bearing surface of the control member whereby the driving member is adapted to slide longitudinally on the control member and also rotate thereon, and means separate from the said two parts and forming the driving connection between them.

2. An engine starter drive or transmission comprising a rotatable member, and an operating member mounted thereon for longitudinal movement thereof and rotary movement therewith, said operating member being formed of two parts, one a control member mounted on said rotatable member and having an outer bearing surface of uniform diameter, and the other a driving member having a smooth bore fitting on the control member, and a yielding means forming the driving connection between said control and driving members.

3. An engine starter drive or transmission comprising a rotatable member, an operating member mounted thereon for longitudinal movement thereof and rotary movement therewith, said operating member being formed of two parts, one a control member mounted on said rotatable member and the other a driving member mounted on the control member and having longitudinal and rotary movements with respect to the latter, and combined means operating as the yielding driving connection between said control and driving members and as a resistance to said longitudinal movement of the driving member on the control member.

4. An engine starter drive or transmission comprising a rotatable member, an operating member mounted thereon for longitudinal movement thereof and rotary movement therewith, said operating member being formed of two parts, one a control member mounted on said rotatable member and the other a driving member mounted on the control member, said driving member being adapted to engage a part of the engine to be started, and a spring forming the driving connection between said control and driving members and a resistance to said longitudinal movement of the driving member on the control member.

5. An engine starter drive comprising a screw shaft and an operating member mounted thereon for longitudinal movement thereof and rotary movement therewith and consisting of a screw sleeve screw-threaded on the shaft and a driving member mounted to float on and be rotated by such sleeve, and a spring forming the driving means between the sleeves and driving member.

6. An engine starter drive comprising a screw shaft and an operating member mounted thereon for longitudinal movement thereof and rotary movement therewith and consisting of a screw sleeve screw-threaded on the shaft, a driving member mounted to freely float on and be rotated by such sleeve, and a yielding means forming the driving connection between the sleeve and driving member.

7. An engine starter drive comprising a screw shaft and an operating member mounted thereon for longitudinal movement thereof and rotary movement therewith and consisting of a screw sleeve screw-threaded on the shaft, a driving member mounted to float on and be rotated by such sleeve, and a driving spring forming the driving connection between the sleeve and driving members, said spring being a coil spring capable of compression and coöperating with the driving member to resist longitudinal movement thereof on the sleeve.

8. An engine starter drive comprising a screw shaft and an operating member mounted thereon for longitudinal movement thereof and rotary movement therewith and consisting of a screw sleeve screw-threaded on the shaft and a pinion mounted to slide on and to rotate with the sleeve, and a spring forming the driving means between the sleeve and pinion.

9. An engine starter drive comprising a screw shaft and an operating member mounted thereon for longitudinal movement thereof and rotary movement therewith and consisting of a screw sleeve screw-threaded on the shaft and a pinion mounted to slide on and to rotate with and also independently of the sleeve, and a driving spring connected respectively to the sleeve and pinion and forming the driving means between them.

10. An engine starter drive comprising a screw shaft and an operating member mounted thereon for longitudinal movement thereof and rotary movement therewith and consisting of a screw sleeve screw-threaded on the shaft and a pinion mounted to slide on and to rotate with the sleeve, and a driving spring connected respectively to the sleeve and pinion and forming the driving means between them, said spring being a coiled compression spring coöperating with the pinion to yieldingly hold it in a normal position with respect to the sleeve.

11. An engine starter drive comprising a screw shaft and an operating member mounted thereon for longitudinal movement thereof and rotary movement therewith and consisting of a screw sleeve screw-threaded on the shaft and a pinion mounted to slide on and to rotate with the sleeve, said sleeve having a radially extending support, and a spiral driving spring, one end of which is connected to said support and the other to the pinion and which forms the driving connection between them.

12. An engine starter drive comprising a screw shaft and an operating member mounted thereon for longitudinal movement thereof and rotary movement therewith and consisting of a screw sleeve screw-threaded on the shaft and a pinion mounted to slide on and to rotate with the sleeve, said sleeve having a radially extending support, and a spiral driving spring, one end of which is connected to said support and the other to the pinion, said spring in normal condition being conical in cross section and coöperating with the pinion to yieldingly hold it in a normal position with respect to the sleeve.

13. An engine starter drive comprising a screw shaft and an operating member mounted thereon for longitudinal movement thereof and rotary movement therewith and consisting of a screw sleeve screw-threaded on the shaft and a pinion mounted to slide on and to rotate with the sleeve, said sleeve having at one end a disk, and a spiral driving spring, the outer end of which is connected to the disk and the inner end to the pinion and which forms the driving connection between them.

14. An engine starter drive comprising a screw shaft and an operating member mounted thereon for longitudinal movement thereof and rotary movement therewith and consisting of a screw sleeve screw-threaded on the shaft and a pinion mounted to slide on and to rotate with the sleeve, said sleeve having at one end a flanged disk forming a spring drum or casing, and a spiral driving spring arranged within the drum, the outer end of the spring being connected to the drum and the inner end to the pinion.

VINCENT BENDIX.